Dec. 4, 1962     E. T. PENNINGTON     3,067,346

IONIZATION VACUUM GAUGE

Filed Dec. 7, 1959

INVENTOR.
EDGAR T. PENNINGTON
BY
*Spencer E. Olson*
ATTORNEY

United States Patent Office 3,067,346
Patented Dec. 4, 1962

3,067,346
IONIZATION VACUUM GAUGE
Edgar T. Pennington, Williamsport, Pa., assignor to Sylvania Electric Products Inc., a corporation of Delaware
Filed Dec. 7, 1959, Ser. No. 857,855
8 Claims. (Cl. 313—7)

This invention relates to apparatus for measuring very low gas pressures, such as those within evacuated chambers, by measurement of an ionization current established within the rarefied atmosphere of the gas. More particularly, this invention is an improvement of the ionization vacuum gauge disclosed and claimed in application Serial No. 855,685, filed November 27, 1959, by George W. Hees, now Pat. No. 3,019,360, assigned to the assignee of the present application.

As is well understood in the art to which the invention pertains, very low gas pressures may be measured by providing within the gaseous atmosphere a cathode, a positively charged anode arranged to accelerate and collect electrons emitted from the cathode, and a negatively charged collector electrode arranged to collect positively charged gaseous ions generated by impact of the electrons with gaseous molecules. In general, the total number of ions collected for a constant electron current affords a measure of the gas pressure.

Ionization vacuum gauges of the prior art, all employing this general principle, have taken three general different forms. In one form, the cathode is positioned in the center of the tube and is surrounded by an acceleration electrode of wire mesh. External to the acceleration electrode is a plate or ion collector, which may be a band of conductive material evaporated onto the tube envelope, which is negative with respect to the cathode. In another form, the collector electrode comprises a fine wire of conducting material positioned centrally of the tube. Surrounding this collector electrode is an acceleration electrode, in the form of a spiral of thin wire, and a cathode is positioned external of the acceleration electrode. In still another form, a fourth electrode in addition to the three just described, is positioned within the cylindrical acceleration electrode. This fourth electrode has a positive potential relative to the cathode and is so arranged with regard to the cathode and collector electrode as to collect a variable part of the electrons in accordance with the potential of the collector electrode.

The ionization gauge of the above-referenced application is based on the realization that it is unnecessary to have the cathode and collector electrode on opposite sides of the acceleration electrode; i.e., the collector inside the cylindrical grid electrode and the filamentary cathode outside, or vice versa. The cylindrical accelerator electrode had previously been regarded as a grid, whereas its real function is to establish, in cooperation with the cathode, a potential gradient for accelerating electrons emitted by the cathode to a velocity sufficient to generate positive gaseous ions by impact of the electrons with gaseous molecules. To obtain ionization of the gas in a rarefied atmosphere, it is necessary only that the cathode and accelerating electrode be separated, and that means be provided in the region where the ions are formed to collect the ions.

The ionization gauge disclosed in the above-entitled application features an elongated cylindrical accelerating electrode, which may be in the form of a wire wound into a helical structure, a filamentary cathode disposed within the accelerating electrode, and an ion collector also positioned within the accelerating electrode. The acceleraing electrode is charged positively relative to the cathode whereby electrons emitted by the cathode are accelerated radially outward toward the accelerating electrode whereby substantially the entire volume within the helical accelerating electrode is subjected to high velocity electrons which can ionize gas molecules in which they come in contact in traveling to the accelerating electrode. The collector electrode, which is negatively charged relative to the cathode and the accelerating electrode, collects the positive ions generated by such collisions, to provide a measure of the pressure within the tube. The efficiency is thus enhanced since most of the electrons travel only within the space between the cathode and the accelerating electrode, with substantially uniform electron density within the volume, and substantially all of the positive ions which are generated are confined within the accelerating electrode where they can be efficiently collected. Since none of the tube elements is external of the accelerating electrode, the tube envelope need only be large enough to contain the accelerating electrode, thus permitting the use of a smaller bulb than has been required for prior art tubes.

It is the primary object of the present invention to improve the sensitivity of the ionization vacuum gauge of the type disclosed in the above-entitled application.

A more general object of the invention is the provision of an improved apparatus of increased sensitivity whereby substantially smaller gaseous pressures may be measured or whereby pressures now measurable may be measured with a higher degree of precision.

Increased efficiency is attained, in accordance with the invention, by the incorporation in a tube having the electrode configuration described in the above-entitled application of an ion collector including a plurality of conductors connected at one end to a common terminal and respectively disposed in different sectors of the cylindrical volume defined by the acceleration electrode. In one form, the collector is in the shape of a Y with the leg of the Y supported at the bottom of the tube and the arm extending upwardly and outwardly toward the acceleration electrode and lying in opposite halves of the volume defined by the acceleration electrode. In another form, the collector electrode is in the shape of a double-Y having a common leg and the arms of the two Y's displaced circumferentially from each other by 90° such that one lies in each quarter of the cylindrical volume. Since most of the electrons from the cathode travel only within the space between the cathode and the accelerating electrode, with substantially uniform electron density within the volume, positive ions are likewise generated throughout the volume; the provision of an ion collector electrode, which is effectively distributed throughout the volume, improves the efficiency of ion collection.

In still another form, the collector is in the form of a U-shaped loop extending longitudinally within the accelerating electrode and supported on two pins projecting through the tube base. This construction permits electrical connection to both ends of the electrode whereby it may be electrically heated for degassing.

Other advantages and features of the invention will become apparent from the following description, taken in connection with the accompanying drawings, in which.

Figure 1:
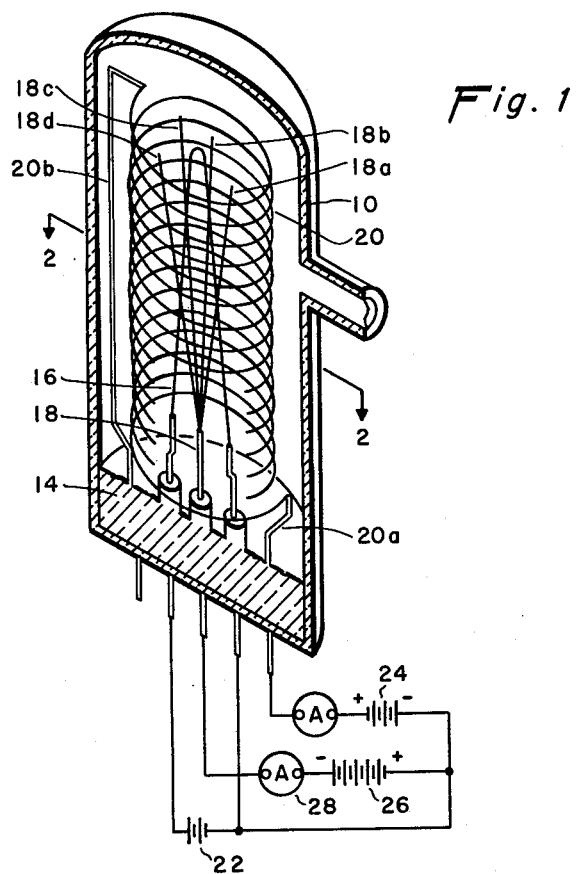
FIG. 1 is an elevation cross-section of one embodiment of a vacuum gauge according to the invention.
Figure 2:
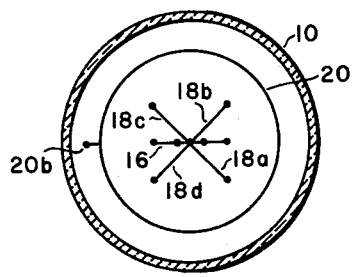
FIG. 2 is a cross-sectional view of the tube taken along line 2—2 of FIG. 1.

Referring to FIGS. 1 and 2, the ionization vacuum gauge in accordance with the invention includes an envelope 10 of glass or other material which is impervious to gases. Connected to the side of the envelope 10 is a pipe or tubulation 12 for connecting the tube to a vacuum system, the pressure of which is to be measured. Supported on a suitable press 14, which in turn forms the lower enclosure of the envelope, and extending into the tube is a heated cathode 16, which may be of inverted V-shape as shown. Also supported on the press 14, between the supports for the cathode 16, is an ion collector electrode 18 formed of conducting material. This electrode preferably is in the form of a double-Y, the common leg of which is supported on the press 14, and the arms 18a, 18b, 18c and 18d of which extend upwardly and outwardly from a common point. The arms are spaced from each other by substantially 90°, with their extremities lying on a circle, the entire structure being so disposed that the cathode 16 lies between the arms and is insulated therefrom. The acceleration electrode 20 may consist of a thin wire formed into a helix supported at the lower end on a support 20a sealed in the press 14 and at the upper end by a stiff wire 20b extending along the outside of the helix and sealed in the press 14. The wire of which the helix 20 is formed is of sufficiently heavy gauge and stiffness that adjacent turns do not come in contact with each other, even when subjected to heating currents sufficient for outgassing. Alternatively, the acceleration electrode may be a double reverse-wound helix with the entire structure supported on the press. The helix 20 surrounds both the cathode 16 and collector electrode 18 and is of a diameter to afford a sufficiently long path in which electrons can encounter gas molecules for ionization purposes.

As shown in the drawing, the cathode 16 is connected to a source 22 of heating current. A potential is applied between the cathode 16 and acceleration electrode 20 by a source 24 whereby the acceleration electrode is positive with respect to the cathode. The ion collector 18 has a potential applied thereto from source 26 which is negative with respect to both the cathode and the acceleration electrode.

In operation, electrons from the cathode 16 are accelerated by the acceleration electrode 20 toward that electrode. Since the ion collector 18 is negative with respect to the cathode and the acceleration electrode, the electrons will be repelled by these electrodes and will move radially outward toward the acceleration electrode. As electrons move outwardly toward the acceleration electrode, with high velocities, some of them will strike molecules of the gas in the volume defined by the acceleration electrode and thereby cause ionization of the gas. The positive ions which are produced by this ionization are attracted toward the ion collector 18 which is negative. The double-Y shape of the ion collector 18 effectively places an ion collector in each of four sectors of the volume and thus increases the efficiency of ion collection.

If the current of electrons through the tube is held constant, the number of ions produced per unit time will be substantially proportional to the pressure of the gas inside the tube. Therefore, since the current passing from the ion collector electrode through the ammeter 28 is proportional to the number of ions which reach the collector electrode per unit time, the reading on the ammeter 28 is an indication of the pressure in the tube.

Figure 3:
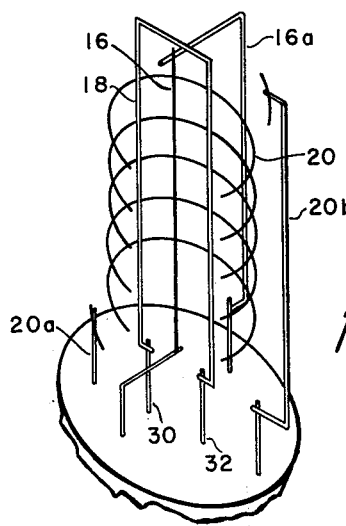
FIG. 3 is a perspective view, partially cut away, of the electrodes of another embodiment of the invention.

FIG. 3 illustrates another arrangement of electrodes which affords the advantages outlined above. As in the tube of FIG. 1, the helical accelerating electrode 20 is supported on members 20a and 20b whereby electrical connection may be made to both ends of the electrode. The filament 16 is a straight coated wire supported at the upper end of a rigid conductor 16a and connected at the lower end to pin 16b, which projects through the tube base. Conductor 16a, likewise, is secured to a pin which projects externally of the tube. Ion collector electrode 18 is of inverted U-shape, and is supported at the ends of its arms on pins 30 and 32 in the tube base. Electrode 18 is formed of a thin conductive wire of sufficiently heavy gauge that it is self-supporting, even when subjected to the heating currents necessary for de-gassing. The loop 18 and the filament 16 are in the same vertical plane, being disposed along a diameter of accelerating electrode 20, and are substantially coextensive with electrode 20. The width of the loop 18 is approximately equal to the radius of electrode 20, and is positioned symmetrically with respect to the filament, whereby the sides of the loop are substantially equidistantly spaced between the filament and opposite sides of the accelerating electrode. This construction effectively places an ion collector in each of two halves of the sensitive volume of the tube and thus enhances the efficiency of ion collection.

In use, the cathode 16 is connected to a source of heating current, and a potential is applied between the cathode and the acceleration electrode such that the acceleration electrode is positive with respect to the cathode. The ion collector has a potential applied thereto which is negative with respect to both the cathode and the acceleration electrode. Thus, electrons emitted by the cathode are accelerated toward electrode 20 and ionize the gas molecules with which they collide. The positive ions which are produced are attracted toward the ion collector 18 which is negative.

An important advantage of the construction of FIG. 3 is that each of the three electrodes have external connections at each end whereby each may be heated electrically for de-gassing purposes. Moreover, this construction is rugged and will withstand shock and vibration.

From the foregoing it is seen that applicant has provided an improved ionization type vacuum gauge wherein the source of electrons, the collector and the acceleration or grid electrode are so positioned relative to each other as to produce ionization in the grid-collector volume of the tube. The source of electrons and the ion collector are both positioned within the volume defined by the hollow cylindrical acceleration electrode. This construction offers the advantage of a smaller envelope for the electrodes, a more uniform electron density within the active volume of the tube, and better ion collection efficiency. Tests on the tube, having the illustrated ion collector configurations, have indicated that the pressure-collector current characteristic of the tube is linear down to a pressure at least as low as $1 \times 10^{-6}$ mm. and has a sensitivity of the order of 16.

Although there has been shown and described two specific embodiments of the invention, other modifications may now be suggested to ones skilled in the art. For example, the collector electrode may be of a single Y-configuration instead of the double-Y configuration illustrated, or it may be in the form of U's welded to a common support electrode 18. The significant feature is that the ion collector is distributed within the cathode-acceleration electrode volume; it will be apparent that this result can be obtained with electrodes of a variety of shapes and curvatures. The invention therefore is not to be restricted except insofar as such limitations appear in the appended claims.

What is claimed is:

1. An ionization vacuum gauge comprising an envelope of material impervious to air, a single accelerating electrode within said envelope comprising a conductor wound in helical form and defining a substantially cylindrical volume, a cathode of inverted V-shape extending along the central axis of said volume, and an ion collector comprising a conducting structure of Y-shape, the leg of said structure being disposed along the central axis of said volume with the arms thereof extending longitudinally of and outwardly toward said acceleration electrode.

2. An ionization vacuum gauge comprising an envelope of material impervious to air, a single acceleration electrode within said envelope comprising a conductor wound in helical form and defining a substantially cylindrical volume, a cathode of inverted V-shape supported near one end of said volume and extending along the central axis of said volume, and an ion collector comprising a conducting structure of double Y-shape having a common leg disposed between the elements of the cathode at the supported end with the arms thereof extending lengthwise of said volume and lying between the cathode and the acceleration electrode.

3. An ionization gauge comprising an envelope of material impervious to air, a single acceleration electrode within said envelope comprising a conductor wound in helical form and defining a substantially cylindrical volume, a straight filamentary cathode supported along the longitudinal axis of said volume, and an ion collector comprising a conducting loop of inverted U-shape with the sides of the loop disposed in a vertical plane including said cathode and lying between the cathode and the acceleration electrode.

4. An ionization gauge in according with claim 3 wherein each of said cathode, acceleration electrode and ion collector is provided with external connections at each end thereof to permit electrical heating for de-gassing.

5. An ionization gauge comprising an envelope of material impervious to air, a single acceleration electrode within said envelope comprising a conductor wound in helical form and defining a substantially cylindrical volume, an elongated filamentary cathode supported in a diametral plane of said cylindrical volume in close proximity to the longitudinal axis of said volume, and an ion collector including at least two substantially straight conducting wires electrically connected together and supported in a diametral plane of said cylindrical volume and extending for at least a portion of their length through the volume between said cathode and said acceleration electrode.

6. An ionization gauge comprising an envelope of material impervious to air, a single acceleration electrode within said envelope comprising a conductor wound in helical form and defining a substantially cylindrical volume, a filamentary cathode of inverted V-shape supported in a diametral plane of said volume and extending along the longitudinal axis of said volume, and an ion collector including at least two substantially straight conducting wires each supported at one end at a common point near one end of the longitudinal axis of said volume and lying in a different diametral plane of said volume than said cathode, said wires extending outwardly from said point toward opposite sides of said longitudinal axis substantially to the other end of said volume so as to be positioned in the volume between said cathode and said acceleration electrode.

7. An ionization gauge comprising an elongated cylindrical envelope of material impervious to air, a single acceleration electrode within said envelope comprising a conductor wound in helical form and defining a substantially cylindrical volume coaxial with said envelope, a straight filamentary cathode supported along the longitudinal axis of said volume, and an ion collector comprising a loop including two substantially straight sections of fine wire substantially coextensive with said cathode positioned in a diametral plane of said volume substantially equidistant from and on opposite sides of said cathode so as to lie in the volume between said cathode and said acceleration electrode.

8. An ionization gauge comprising an elongated cylindrical envelope of material impervious to air, a single acceleration electrode within said envelope comprising a conductor wound in helical form and defining a substantially cylindrical volume coaxial with said envelope, a straight filamentary cathode supported along the longitudinal axis of said volume, and an ion collector comprising a loop including two substantially straight sections of fine wire substantially coextensive with said cathode positioned in a diametral plane of said volume substantially equidistant from and on opposite sides of said cathode so as to lie in the volume between said cathode and said acceleration electrode, said acceleration electrode, said cathode, and said ion collector each comprising continuous wires each having ends connected to lead-in conductors through said envelope to permit a heating current to be passed through said wires for degassing purposes.

References Cited in the file of this patent

UNITED STATES PATENTS

| | | |
|---|---|---|
| 2,573,005 | Glyptis | Oct. 30, 1951 |
| 2,605,431 | Bayard | July 29, 1952 |
| 2,758,233 | Nelson | Aug. 7, 1956 |
| 2,790,949 | Ottinger | Apr. 30, 1957 |
| 2,829,337 | Groendijk | Apr. 1, 1958 |

FOREIGN PATENTS

| | | |
|---|---|---|
| 964,341 | France | Jan. 25, 1950 |